(12) United States Patent
Liu et al.

(10) Patent No.: US 10,949,439 B2
(45) Date of Patent: Mar. 16, 2021

(54) METHOD, APPARATUS AND SYSTEM FOR DISPLAYING SEARCH RESULTS, APPARATUS AND COMPUTER STORAGE MEDIUM

(71) Applicant: BAIDU ONLINE NETWORK TECHNOLOGY (BEIJING) CO., LTD., Beijing (CN)

(72) Inventors: Junqi Liu, Beijing (CN); Kefeng Li, Beijing (CN); Chao Han, Beijing (CN); Jing Ye, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 254 days.

(21) Appl. No.: 15/741,726

(22) PCT Filed: Dec. 3, 2015

(86) PCT No.: PCT/CN2015/096296
§ 371 (c)(1),
(2) Date: Jan. 3, 2018

(87) PCT Pub. No.: WO2017/049765
PCT Pub. Date: Mar. 30, 2017

(65) Prior Publication Data
US 2018/0196855 A1 Jul. 12, 2018

(30) Foreign Application Priority Data
Sep. 25, 2015 (CN) .......................... 201510622778.0

(51) Int. Cl.
*G06F 16/248* (2019.01)
*G06F 16/951* (2019.01)
*G06F 16/957* (2019.01)

(52) U.S. Cl.
CPC .......... *G06F 16/248* (2019.01); *G06F 16/951* (2019.01); *G06F 16/9577* (2019.01)

(58) Field of Classification Search
CPC ... G06F 16/248; G06F 16/951; G06F 16/9577
(Continued)

(56) References Cited

U.S. PATENT DOCUMENTS

| 5,950,187 A | * | 9/1999 | Tsuda | ...................... | G06F 16/93 |
| 6,560,620 B1 | * | 5/2003 | Ching | ..................... | G06F 40/20 |
| | | | | | 715/229 |

(Continued)

FOREIGN PATENT DOCUMENTS

| CN | 103092976 A | 5/2013 |
| CN | 103399931 A | 11/2013 |

(Continued)

OTHER PUBLICATIONS

Dumais, Susan, et al., "Optimizing Search by Showing Results in Context", SIGCHI '01, Seattle, WA, Mar. 31-Apr. 4, 2001, pp. 277-284.*

(Continued)

*Primary Examiner* — Robert Stevens
(74) *Attorney, Agent, or Firm* — Ladas & Parry, LLP (57) ABSTRACT

The present disclosure provides a method, apparatus and system for displaying search results, an apparatus and a computer storage medium. On the one hand, according to embodiments of the present disclosure, the key word is sent to the server so that the server performs a search according to the key word to obtain at least two page files, each of the page files including at least one search result matching the key word, thereby receiving the at least two page files sent by the server; thereby, according to the page style and the special display effect corresponding to each of the page files, rendering each of said page files to display the search result (Continued)

matching the key word. Hence, the technical solutions provided by embodiments of the present disclosure solve the problem in the prior art that the form of displaying the search result page is relatively single and exhibits lower interactivity and flexibility.

17 Claims, 4 Drawing Sheets

(58) Field of Classification Search
USPC .......................................................... 707/722
See application file for complete search history.

(56) References Cited

U.S. PATENT DOCUMENTS

| | | | |
|---|---|---|---|
| 6,820,237 B1* | 11/2004 | Abu-Hakima | G06F 40/117 |
| | | | 715/210 |
| 7,111,237 B2* | 9/2006 | Chan | G06F 40/169 |
| | | | 715/265 |
| 7,660,813 B2* | 2/2010 | Milic-Frayling | G06F 16/9535 |
| | | | 707/999.102 |
| 8,560,559 B1* | 10/2013 | Patel | G06F 16/24575 |
| | | | 707/758 |
| 9,916,383 B1* | 3/2018 | Ching | G06F 16/316 |
| 2003/0226104 A1* | 12/2003 | Blazejewski | G06F 16/9558 |
| | | | 715/206 |
| 2004/0080532 A1* | 4/2004 | Cragun | G06F 16/34 |
| | | | 715/745 |
| 2004/0260687 A1* | 12/2004 | Mano | G06F 16/338 |
| 2006/0031760 A1* | 2/2006 | Jacobs | G06F 16/93 |
| | | | 715/251 |
| 2006/0041530 A1* | 2/2006 | Milic-Frayling | G06F 16/9535 |
| 2006/0156222 A1* | 7/2006 | Chi | G06F 40/247 |
| | | | 715/231 |
| 2007/0050379 A1* | 3/2007 | Day | G06F 16/248 |
| 2007/0143260 A1* | 6/2007 | Markov | G06Q 30/02 |
| 2007/0220480 A1* | 9/2007 | Waldman | G06F 40/151 |
| | | | 717/106 |
| 2007/0282809 A1* | 12/2007 | Hoeber | G06F 16/338 |
| 2008/0235608 A1* | 9/2008 | Prabhu | G06F 16/9535 |
| | | | 715/765 |
| 2008/0256058 A1* | 10/2008 | Kother | G06F 16/338 |
| 2009/0094213 A1* | 4/2009 | Wang | G06F 16/9535 |
| 2009/0300483 A1* | 12/2009 | Viet | G06F 40/14 |
| | | | 715/236 |
| 2010/0005060 A1* | 1/2010 | Shebanow | G06F 16/00 |
| | | | 707/E17.108 |
| 2010/0082670 A1 | 4/2010 | Chan et al. | |
| 2010/0110099 A1* | 5/2010 | Averett | G06F 16/951 |
| | | | 345/592 |
| 2010/0131491 A1* | 5/2010 | Lemaire | G06F 16/951 |
| | | | 707/722 |
| 2011/0119262 A1* | 5/2011 | Dexter | G06F 16/951 |
| | | | 707/726 |
| 2012/0150861 A1* | 6/2012 | Thione | G06F 16/9038 |
| | | | 707/741 |
| 2012/0253984 A1* | 10/2012 | Westphal | G06Q 30/0631 |
| | | | 705/27.1 |
| 2013/0159843 A1* | 6/2013 | Wan | G06F 40/103 |
| | | | 715/248 |
| 2013/0174021 A1* | 7/2013 | Buchwald | G06F 40/154 |
| | | | 715/235 |
| 2013/0179437 A1* | 7/2013 | Pelenur | G06F 16/9577 |
| | | | 707/722 |
| 2014/0136536 A1 | 5/2014 | Ramsey et al. | |
| 2014/0236926 A1* | 8/2014 | Lisa | G06F 16/93 |
| | | | 707/722 |
| 2014/0310588 A1* | 10/2014 | Bhogal | G06F 16/00 |
| | | | 715/234 |
| 2015/0161261 A1* | 6/2015 | Griddaluru | G06F 16/338 |
| | | | 707/707 |

FOREIGN PATENT DOCUMENTS

| | | |
|---|---|---|
| CN | 103886056 A | 6/2014 |
| CN | 104145265 A | 11/2014 |
| CN | 104156795 A | 11/2014 |
| CN | 104317954 A | 1/2015 |
| CN | 104809195 A | 7/2017 |
| WO | 2015079438 A2 | 6/2015 |
| WO | 2015079438 A3 | 6/2015 |

OTHER PUBLICATIONS

Strobelt, Hendrik, et al., "Guidelines for Effective Usage of Text Highlighting Techniques", IEEE Transactions on Visualization and Computer Graphics, vol. 22, Issue 1, © 2015, pp. 489-498.*
Quint, Vincent, et al., "Editing with Style", DocEng '07, Winnipeg, Manitoba, Canada, Aug. 28-31, 2007, pp. 151-160.*
Kennedy, Anthony, et al., "Chapter 9: Dynamic CSS", Pro CSS for High Traffic Websites, Apress, © 2011, pp. 261-299.*
Zhang, Kaimin, et al., "Smart Caching for Web Browsers", WWW 2010, Raleigh, NC, Apr. 26-30, 2010, pp. 491-500.*
International Search Report for PCT/CN2015/096296 dated Sep. 29, 2015, Chinese Office Action, 6 pp.
Written Opinion of the International Search Authority for PCT/CN2015/096296 dated Jun. 14, 2016, Chinese Office Action, 6 pp.
First office action and search report from CN app. No. 201510622778.0, dated Mar. 2, 2018, with English translation from Global Dossier, 19 pages.
Notification to grant patent right for invention from CN app. No. 201510622778.0, dated Aug. 3, 2018, with English translation from Global Dossier, 3 pages.
Extended European search report from EP app. No. 15904640.8, dated Apr. 24, 2018, 11 pages.
Communication pursuant to Article 94(3) EPC, for EP app. No. 15904640.8, dated Oct. 25, 2019, 8 pages.
Invitation to filed a search results or a statement of non-availability pursuant to Rule 70b(1) EPC, dated Dec. 11, 2018, 1 page.
International Preliminary Report on Patentability from PCT/CN2015/096296, dated Mar. 27, 2018, with English translation from WIPO, 8 pages.
"Get Your Meta on with One Dozen Metasearch Engines", SearchEnginePeople, Inc., http://searchenginepeople.com/blog/get-your-meta-on-with-one-dozen-metasearch-engines.html, accessed online Apr. 13, 2018, pp. 1-16.
Patterson, Ben, "6 time-saving Safari gestures for iPhone and iPad", Macworld, Feb. 20, 2015, 6 pages.

* cited by examiner

METHOD, APPARATUS AND SYSTEM FOR DISPLAYING SEARCH RESULTS, APPARATUS AND COMPUTER STORAGE MEDIUM

CROSS-REFERENCE TO RELATED APPLICATIONS

The present disclosure is the U.S. national phase of PCT Application PCT/CN2015/096296 filed on Dec. 3, 2015, which claims priority to the Chinese patent application No. 201510622778.0 filed Sep. 25, 2015, the disclosures of which are incorporated herein by reference in their entireties.

FIELD OF THE DISCLOSURE

The present disclosure relates to the technical field of Internet application, and particularly to a method, apparatus and system for displaying search results, an apparatus and a computer storage medium.

BACKGROUND OF THE DISCLOSURE

A search result page is a set of several search results. When a user inputs a key word in a browser or client, a server may perform a search according to the key word and obtain search results matching the key word, then generate a page file according to these search results, then send the page file and a page style to the client or browser, and the client or browser displays the search results in the page file according to the page style.

In the prior art, the page style configured by the server for the client is with respect to the whole search result page. Furthermore, the user can only perform interactive operation for the whole search result, and seldom perform interactive operation for a single or several search results. Hence, the form of displaying the search result page in the prior art is relatively single and exhibits lower interactivity and flexibility.

SUMMARY OF THE DISCLOSURE

In view of the above, embodiments of the present disclosure provide a method, apparatus and system for displaying search results to solve the problem in the prior art that the form of displaying the search result page in the prior art is relatively single and exhibits lower interactivity and flexibility.

According to an aspect of the present disclosure, there is provided a method of displaying search results, comprising:
sending a key word to a server so that the server performs a search according to the key word to obtain at least two page files, each of the page files including at least one search result matching the key word;
receiving the at least two page files sent by the server;
according to a page style and a special display effect corresponding to each of the page files, rendering each of said page files to display the search result matching the key word.

The above aspect and any possible implementation mode further provide an implementation mode: before rendering each of said page files according to the page style and the special display effect corresponding to each of the page files, the method further comprises:
receiving the page style and special display effect corresponding to each of the page files sent by the server; or receiving the page style corresponding to each of the page files sent by the server, and obtaining the special display effect corresponding to each of said page files preset locally; or,
receiving the special display effect corresponding to each of the page files sent by the server, and obtaining the page style corresponding to each of said page files preset locally; or
obtaining the page style and the special display effect corresponding to each of the page files preset locally.

The above aspect and any possible implementation mode further provide an implementation mode: the method further comprises:
obtaining a page resource preset locally;
displaying the page resource during display of search results included in each page file and matching the key word.

The above aspect and any possible implementation mode further provide an implementation mode: rendering each of said page files according to the page style and the special display effect corresponding to each of the page files comprises:
rendering each page file according to the page style and the special display effect of each page file and the page style of a page file preceding each page file, to display search results included by each page file and matching with the key word.

The above aspect and any possible implementation mode further provide an implementation mode: the method further comprises:
performing a deletion operation or a display position adjustment operation for the search result according to a gesture for the search result; or,
displaying a detail page of the search result according to a click operation for the search result.

The above aspect and any possible implementation mode further provide an implementation mode: the method further comprises:
when the detail page of the search result undergoes page skip, switching the current page from the detail page of the search result to other pages according to a preset special switching effect.

According to another aspect of embodiments of the present disclosure, there is provided a method of displaying search results, comprising:
receiving a key word sent by the client;
performing a search according to the key word to obtain at least two page files, each of the page files including at least one search result matching the key word;
sending at least two page files to the client so that the client, according to the page style and special display effect corresponding to each of said page files, renders each of the page files to display the search result matching the key word.

The above aspect and any possible implementation mode further provide an implementation mode: performing a search according to the key word to obtain at least two page files comprises:
performing a search according to the key word to obtain at least two search results matching the key word;
generating the at least two page files according to at least two search results matching the key word.

The above aspect and any possible implementation mode further provide an implementation mode: the method further comprises:
sending, to the client, the page style or the special display effect corresponding to each of the page files; or
sending, to the client, the page style corresponding to each of the page files; or sending, to the client, the special display effect corresponding to each of the page files.

According to a further aspect of embodiments of the present disclosure, there is provided an apparatus for displaying search results, comprising:

a sending unit configured to send a key word to a server so that the server performs a search according to the key word to obtain at least two page files, each of the page files including at least one search result matching the key word;

a receiving unit configured to receive the at least two page files sent by the server;

a rendering unit configured to, according to a page style and a special display effect corresponding to each of the page files, render each of said page files to display the search result matching the key word.

The above aspect and any possible implementation mode further provide an implementation mode: the receiving unit is further configured to receive the page style and the special display effect corresponding to each of the page files sent by the server; or the receiving unit is further configured to receive the page style corresponding to each of the page files sent by the server; the apparatus further comprises: a first obtaining unit configured to obtain the special display effect corresponding to each of said page files preset locally; or, the receiving unit is further configured to receive the special display effect corresponding to each of the page files sent by the server, and the first obtaining unit is configured to obtain the page style corresponding to each of said page files preset locally; or, the first obtaining unit is configured to obtain the page style and the special display effect corresponding to each of the page files preset locally.

The above aspect and any possible implementation mode further provide an implementation mode: the apparatus further comprises: a second obtaining unit configured to obtain a page resource preset locally;

the rendering unit is further configured to display the page resource during display of search results included in each page file and matching the key word.

The above aspect and any possible implementation mode further provide an implementation mode: the rendering unit is specifically configured to:

render each page file according to the page style and special display effect of each page file and the page style of a page file preceding each page file, to display search results included by each page file and matching with the key word.

The above aspect and any possible implementation mode further provide an implementation mode: the apparatus further comprises: a processing unit configured to perform a deletion operation or a display position adjustment operation for the search result according to a gesture for the search result; or, the rendering unit is further configured to display a detail page of the search result according to a click operation for the search result.

The above aspect and any possible implementation mode further provide an implementation mode: the apparatus further comprises:

a switching unit configured to, when the detail page of the search result undergoes page skip, switch the current page from the detail page of the search result to other pages according to a preset special switching effect.

According to a further aspect of embodiments of the present disclosure, there is provided an apparatus for displaying search results, comprising:

a receiving unit configured to receive a key word sent by the client;

a searching unit configured to perform a search according to the key word to obtain at least two page files, each of the page files including at least one search result matching the key word;

a sending unit configured to send at least two page files to the client so that the client, according to a page style and a special display effect corresponding to each of said page files, renders each of the page files to display the search result matching the key word.

The above aspect and any possible implementation mode further provide an implementation mode: the searching unit is specifically configured to:

perform a search according to the key word to obtain at least two search results matching the key word;

generate the at least two page files according to at least two search results matching the key word.

The above aspect and any possible implementation mode further provide an implementation mode: the sending unit is further configured to:

send, to the client, the page style or the special display effect corresponding to each of the page files; or send, to the client, a page style corresponding to each of the page files; or send, to the client, the special display effect corresponding to each of the page files.

According to a further aspect of embodiments of the present disclosure, there is provided a system for displaying search results, comprising: a client and a server, wherein, the client is configured to send the key word to the server;

the server is configured to perform a search according to the key word to obtain at least two page files, each of the page files including at least one search result matching the key word; and send the at least two page files to the client;

the client is further configured to, according to the page style and special display effect corresponding to each of said page files, render each of the page files to display the search result matching the key word.

As can be seen from the above technical solutions, embodiments of the present disclosure have the following advantageous effects:

In technical solutions provided by embodiments of the present disclosure, as for search results matching the key word, each page file may be rendered according to the page style and special display effect of each page file, and each page file may have a different page style and special display effect. As compared with the technical solution in the prior art in which there is only one page file and the page file is configured with the page style, the embodiments of the present disclosures solve the problem in the prior art that the form of displaying the search result page is relatively single and exhibits lower interactivity and flexibility, and improve diversity, interactivity and flexibility of the forms of displaying the search result page.

DETAILED DESCRIPTION OF PREFERRED EMBODIMENTS

The present disclosure will be described in detail in conjunction with figures and specific embodiments to make objectives, technical solutions and advantages of the present disclosure more apparent.

It should be appreciated that embodiments described here are only partial embodiments of the present disclosure, not all embodiments. Based on embodiments in the present disclosure, all other embodiments obtained by those having ordinary skill in the art without making inventive efforts all fall within the protection scope of the present disclosure.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

Embodiment 1

Figure 1:
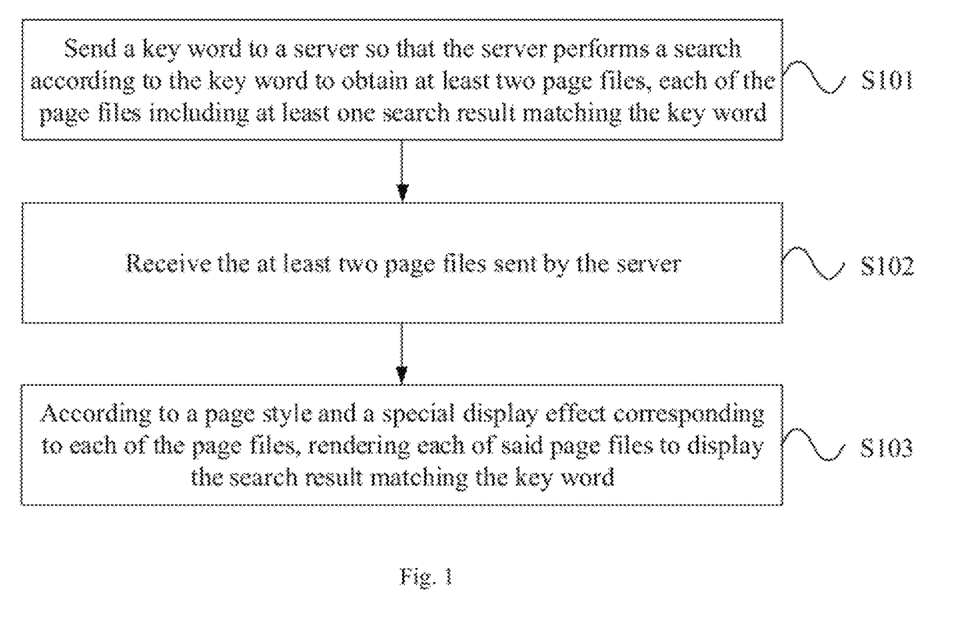
FIG. 1 is a flow chart of a method of displaying search results according to Embodiment 1 of the present disclosure.

Embodiments of the present disclosure provide a method of displaying search results. The present embodiment is an embodiment in which a client side implements the method of displaying search results. Referring to FIG. 1, FIG. 1 is a flow chart of a method of displaying search results according to Embodiment 1 of the present disclosure. As shown in FIG. 1, the method comprises the following steps:

S101: sending a key word to the server so that the server performs a search according to the key word to obtain at least two page files, each of the page files including at least one search result matching the key word.

S102: receiving the at least two page files sent by the server.

S103: according to a page style and a special display effect corresponding to each of the page files, rendering each of said page files to display the search result matching the key word.

It needs to be appreciated that subjects for implementing S101-S103 may be an apparatus for displaying search results, and the system may be located in an application located at a local terminal, or may further be a function unit such as a plug-in or Software Development Kit (SDK) located in the application of the local terminal. This is not particularly limited in the present embodiment. It needs to be appreciated that the application may be a native application (nativeAPP) installed on the terminal, or a web application (webAPP) of a browser on the terminal. This is not specifically limited in the present embodiment.

In the embodiment of the present disclosure, the client may receive the user-input key word, and then send a search request to the server, wherein the search request may carry the key word.

In the embodiment of the present disclosure, after receiving the key word sent by the client, the server performs a search according to the key word and obtains at least two search results matching with the key word. Then, the server obtains at least two page files according to said at least two search results, wherein each of said page files may include at least one search result matching with the key word.

For example, the server may, according to each search result matching with the key word, generate a page file including the search result. Or, the server may also, according to more than two search results matching the key word, generate a page file including more than two search results.

For example, in the embodiment of the present disclosure, the page file may be implemented by but is not limited to a Hyper Text Mark-up Language (HTML).

In a specific implementation procedure, the server may send said at least two page files together to the client. Or, the server may send said at least two page files to the client in turn, and send one page file or more than two page files each time.

Optionally, in a possible implementation mode of the present embodiment, before the client renders each of said page files according to the page style and the display effect corresponding to each of the page files, the client may first obtain the page style and special display effect corresponding to each of said page files.

For example, in the embodiment of the present disclosure, the method of the client obtaining the page style and special display effect corresponding to each of the page files may include but is not limited to the following four types:

The first type: the client receives the page style and special display effect corresponding to each of the page files sent by the server, that is, the page style and special display effect corresponding to each page file need to be configured and sent by the server.

The second type: the client receives the page style corresponding to each of the page files sent by the server, and the client obtains the special display effect corresponding to each of said page files preset locally. That is to say, the page style corresponding to each page file is configured and sent by the server, and the special display effect corresponding to each page file may be pre-configured locally at the client.

The third type: the client receives the special display effect corresponding to each of the page files sent by the server, and obtains the page style corresponding to each of said page files preset locally. That is to say, the special display effect corresponding to each page file is configured and sent by the server, and the page style corresponding to each page file may be pre-configured locally at the client.

The fourth type: the client obtains the page style and special display effect corresponding to each of the page files preset locally. That is, the page style and special display effect corresponding to each page file may be pre-configured locally at the client.

It may be appreciated that the page style is used to define a style of search results displayed by the client, for example, a word style of the search results, a boundary style of the search results, a background style of the search results and the like. The special display effect is used to define a manner in which the client displays the search results on the interface.

For example, in the embodiment of the present disclosure, the method of rendering each of said page files according to the page style and the special display effect corresponding to each of the page files may include but is not limited to the following two types:

The first type: rendering each of said page files according to style information and the special display effect of each page file, to display search results included by each page file and matching with the key word.

The second type: rendering each page file according to the page style and special display effect of each page file and the page style of a page file preceding each page file, to display search results included by each page file and matching with the key word.

In a specific implementation procedure, as for each received page file, a core of the client may render each page file in turn; or, may pre-divide the core of the client into several portions, wherein each portion may render the page file so that the client may simultaneously render several page files.

It may be understood that in the second method, when a certain page file is rendered, reference needs to be made to the page style of a page file preceding the page file, that is, the display of the page file is in a dependency relationship to display of the preceding page file. For example, a display position on the interface occupied by search results in the preceding page file have an impact on a display position on the interface occupied by search results in the current page file. Hence, when a current page file is rendered, reference needs to be made to the page style of the preceding page file.

In a specific implementation procedure, the special display effect of the page file may include but is not limited to: float-in display, small-large display or fade-in display, wherein the float-in display may include: float-in display from above the interface, float-in display from below the interface, float-in display from the left of the interface and float-in display from the right of the interface.

It needs to be appreciated that in the embodiment of the present disclosure, a corresponding page file and special display effect may be preset for each page file; therefore, the page style of each page file may be identical or different; or page styles of partial page files are identical and page styles of remaining page files are different. This is not specifically limited in the present embodiment. Likewise, special display effects of page files may be identical or different; or special display effects of partial page files are identical and special display effects of remaining page files are different. This is not specifically limited in the present embodiment.

It may be appreciated that as for each page file, the client performs rendering according to the page style and special display effect of the page file, thereby displaying different forms of search results, solving the problem about single display form of search results in the prior art, and improving diversity of display forms of the search results.

Optionally, in a possible implementation mode of the present embodiment, the client may further obtain a page resource preset locally; then, display the page resource during display of search results included in each page file and matching the key word.

In a specific implementation procedure, it is feasible to display the page resource at the topmost of the search results displayed in the interface and matching the key word, or display the page resource at the bottommost of the search results displayed in the interface and matching the key word, or display the page resource after a certain page file is rendered in the interface, and then render next page file to display the page resource between the search results included in two page files.

For example, the page resource may include but is not limited to at least one of picture, video and text.

In the embodiment of the present disclosure, since one page file in the prior art is divided into several page files for processing and thereby may implement display of search results separately, the client may dynamically display the page resource preset locally during display of the search results to achieve flexible display of search results and improve display diversity.

Optionally, in a possible implementation mode of the present embodiment, deletion or display position adjustment operation is performed for the search results according to a gesture for the search results.

In a specific implementation procedure, the user's gesture for the search result may be detected after the search result matching the key word is displayed. If the gesture belongs to a preset deletion gesture, for example, leftward slide or rightward slide on the search result, a deletion operation is performed for the search result.

Or, if the gesture belongs to a preset adjustment gesture, for example, upward slide after a long period of pressing or downward slide after a long period of pressing, a display position adjustment operation is performed for the search result according to the slide direction, thereby achieving upward or downward movement of the search result and achieving adjustment of the order of search results on the interface.

It may be appreciated that in the embodiment of the present disclosure, since the search results may be processed according to the user's gesture or operation, interactivity of search results is improved, the search results may be processed conveniently, and the user experience is enhanced.

Optionally, in a possible implementation mode of the present embodiment, a detail page of the search result is displayed according to a click operation for the search result.

In a specific implementation procedure, it is feasible to detect the user's operation for the search result after displaying the search result matching the key word. If it is detected that the user clicks a certain search result, the client sends a request to the server to obtain from the server the page file of the detail page of the search result, and then render the page file to implement the display of the detail page of the search result.

Optionally, in a possible implementation mode of the present embodiment, when the detail page of the search result undergoes page skip, the current page is switched from the detail page of the search result to other pages according to a preset special switching effect.

In a specific implementation procedure, if the user clicks a close button on the detail page of the search result, this indicates that the detail page of the search result undergoes page skip. It is feasible to switch the current page from the detail page of the search result to other pages according to a special switching effect, for example, return to the search result page, or other third party pages.

For example, the special switching effect may include but is not limited to: float-out, large-to-small or fade-out, wherein the float-out may include: float-out from above the interface, float-out from below the interface, float-out from the left of the interface and float-out from the right of the interface.

Embodiment 2

Figure 2:
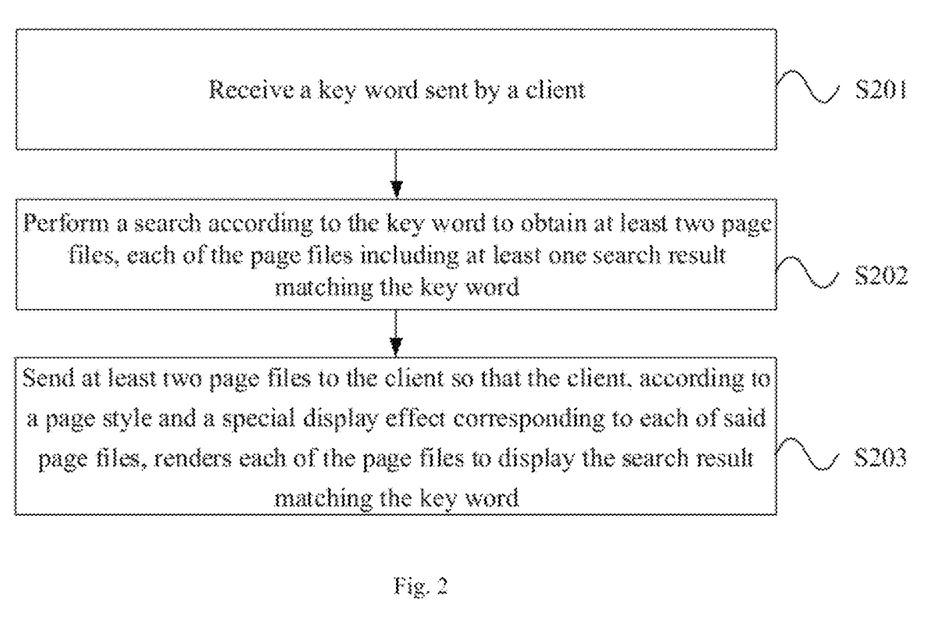
FIG. 2 is a flow chart of a method of displaying search results according to Embodiment 2 of the present disclosure.

The present embodiment is an embodiment in which a server side implements the method of displaying search results. Referring to FIG. 2, FIG. 2 is a flow chart of a method of displaying search results according to Embodiment 2 of the present disclosure. As shown in FIG. 2, the method comprises the following steps:

S201: receiving a key word sent by the client,

S202: performing a search according to the key word to obtain at least two page files, each of the page files including at least one search result matching the key word.

S203: sending at least two page files to the client so that the client, according to the page style and special display effect corresponding to each of said page files, render each of the page files to display the search result matching the key word.

It needs to be appreciated that subjects for executing S201-S203 may be an apparatus for displaying search results, and the apparatus may be located at the server.

In the embodiment of the present disclosure, the client may receive the user-input key word, and then send a search request to the server, wherein the search request may carry the search result. As such, the server may receive the key word sent from the client.

For example, the method of the server performing a search according to the key word to obtain at least two page files may include but is not limited to:

performing search according to the key word to obtain at least two search results matching the key word;

generating the at least two page files according to at least two search results matching the key word.

In a specific implementation procedure, the server may, according to each search result matching with the key word, generate a page file including the search result. Or, the server may also, according to more than two search results matching the key word, generate a page file including more than two search results.

In a specific implementation procedure, the server may send said at least two page files together to the client. Or, the server may send said at least two page files to the client in turn, and send one page file or more than two page files each time.

Optionally, in a possible implementation mode of the present embodiment, the server may send, to the client, a page style or a display style corresponding to each of the page files, that is to say, the server configures the page style and display style for the client. Or, the server may send, to the client, a page style corresponding to each of the page files, that is to say, the server configures the page style only for the client. Or, the server may further send, to the client, a display style corresponding to each of the page files, that is to say, the server configures the display style only for the client.

It may be appreciated that the page style is used to define a style of search results displayed by the client, for example, a word style of the search results, a boundary style of the search results, a background style of the search results and the like. The display style is used to define the special display effect used when the client displays the search result on the interface.

It may be appreciated that the page style of each page file may be identical or different; or page styles of partial page files are identical and page styles of remaining page files are different. This is not specifically limited in the present embodiment.

Embodiments of the present disclosure further disclose apparatus embodiments for implementing steps and method in the above method embodiments.

Figure 3:
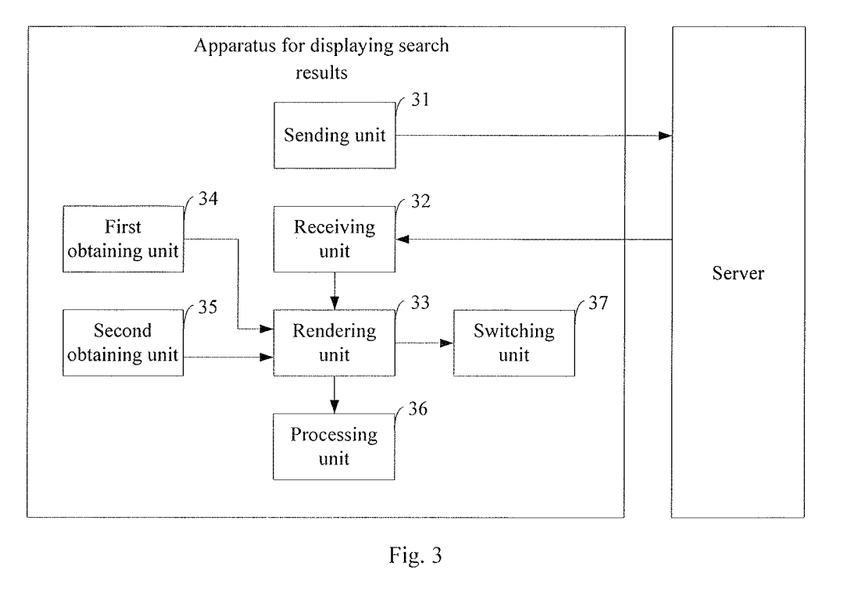
FIG. 3 is a block diagram of an apparatus for displaying search results according to Embodiment 1 of the present disclosure.

Referring to FIG. 3, FIG. 3 is a block diagram of an apparatus for displaying search results according to an embodiment of the present disclosure. The apparatus is a subject for implementing S101-S103, and may be located at the client side. As shown in FIG. 3, the apparatus comprises:

a sending unit 31 configured to send a key word to the server so that the server performs a search according to the key word to obtain at least two page files, each of the page files including at least one search result matching the key word;

a receiving unit 32 configured to receive the at least two page files sent by the server;

a rendering unit 33 configured to, according to a page style and a special display effect corresponding to each of the page files, render each of said page files to display the search result matching the key word.

Optionally, in a possible implementation mode of the present embodiment, the receiving unit 32 is further configured to receive the page style and special display effect corresponding to each of the page files sent by the server; or the receiving unit 32 is further configured to receive the page style corresponding to each of the page files sent by the server; the apparatus further comprises: a first obtaining unit 34 configured to obtain the special display effect corresponding to each of said page files preset locally; or, the receiving unit 32 is further configured to receive the special display effect corresponding to each of the page files sent by the server, and the first obtaining unit 34 is configured to obtain the page style corresponding to each of said page files preset locally;

the first obtaining unit 34 is configured to obtain the page style and special display effect corresponding to each of the page files preset locally.

Optionally, in a possible implementation mode of the present embodiment, the apparatus further comprises: a second obtaining unit 35 configured to obtain a page resource preset locally;

the rendering unit 33 is further configured to display the page resource during display of search results included in each page file and matching the key word.

In a specific implementation procedure, the rendering unit 33 is specifically configured to:

render each page file according to the page style and special display effect of each page file and the page style of a page file preceding each page file, to display search results included by each page file and matching with the key word.

Optionally, in a possible implementation mode of the present embodiment, the apparatus further comprises: a processing unit 36 configured to perform a deletion operation or display position adjustment operation for the search result according to a gesture for the search result; or, the rendering unit 33 is further configured to display a detail page of the search result according to a click operation for the search result.

Optionally, in a possible implementation mode of the present embodiment, the apparatus further comprises:

a switching unit 37 configured to, when the detail page of the search result undergoes page skip, switch the current page from the detail page of the search result to other pages according to a preset special switching effect.

Since units in the present embodiment can execute the method shown in FIG. 1, reference may be made to related depictions of FIG. 1 for portions not described in detail in the present embodiment.

Figure 4:
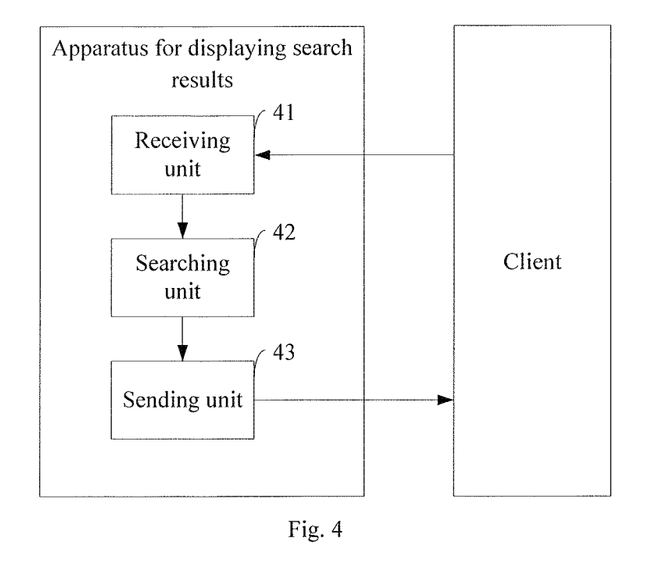
FIG. 4 is a block diagram of an apparatus for displaying search results according to Embodiment 2 of the present disclosure.

Referring to FIG. 4, FIG. 4 is a block diagram of an apparatus for displaying search results according to an embodiment of the present disclosure. The apparatus is a subject for implementing S201-S203, and may be located at the client side. As shown in FIG. 4, the apparatus comprises:

a receiving unit 41 configured to receive a key word sent by the client;

a searching unit 42 configured to perform a search according to the key word to obtain at least two page files, each of the page files including at least one search result matching the key word;

a sending unit 43 configured to send at least two page files to the client so that the client, according to the page style and special display effect corresponding to each of said page files, renders each of the page files to display the search result matching the key word.

In a specific implementation procedure, the searching unit 42 is specifically configured to:

Perform a search according to the key word to obtain at least two search results matching the key word;

generate the at least two page files according to at least two search results matching the key word.

Optionally, in a possible implementation mode of the present embodiment, the sending unit 43 is further configured to:

send, to the client, the page style or the special display effect corresponding to each of the page files; or send, to the client, a page style corresponding to each of the page files; or send, to the client, the special display effect corresponding to each of the page files.

Since units in the present embodiment can execute the method shown in FIG. 2, reference may be made to related depictions of FIG. 2 for portions not described in detail in the present embodiment.

Figure 5:
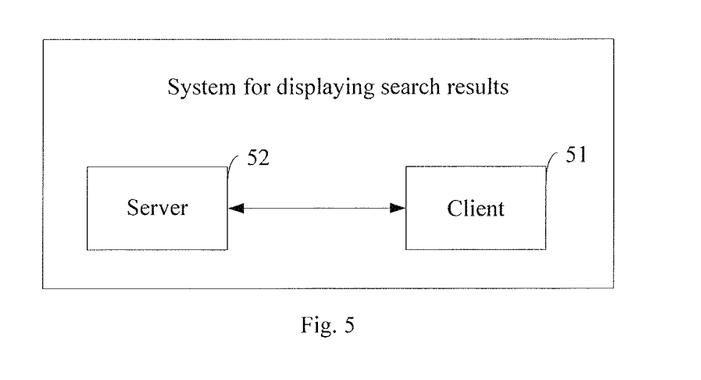
FIG. 5 is a structural schematic diagram of a system of displaying search results according to an embodiment of the present disclosure.

Referring to FIG. 5, FIG. 5 is a block diagram of a system for displaying search results according to an embodiment of the present disclosure. As shown in FIG. 5, the system comprises a client 51 and a server 52, wherein, the client 51 is configured to send the key word to the server 52;

the server 52 is configured to perform a search according to the key word to obtain at least two page files, each of the page files including at least one search result matching the key word; and send the at least two page files to the client 51;

the client 51 is further configured to, according to the page style and special display effect corresponding to each of said page files, render each of the page files to display the search result matching the key word.

Technical solutions of embodiments of the present disclosure have the following advantageous effects:

In embodiments of the present disclosure, the key word is sent to the server so that the server performs a search according to the key word to obtain at least two page files, each of the page files including at least one search result matching the key word, thereby receiving the at least two page files sent by the server; thereby, according to the page style and the special display effect corresponding to each of the page files, rendering each of said page files to display the search result matching the key word.

In technical solutions provided by embodiments of the present disclosure, as for search results matching the key word, each page file may be rendered according to the page style and special display effect of each page file, and each page file may have a different page style and special display effect. As compared with the technical solution in the prior art in which there is only one page file and the page file is configured with the page style, the embodiments of the present disclosures solve the problem in the prior art that the form of displaying the search result page is relatively single and exhibits lower interactivity and flexibility, and improve diversity, interactivity and flexibility of the forms of displaying the search result page.

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented through other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

What are stated above are only preferred embodiments of the present disclosure, not intended to limit the disclosure. Any modifications, equivalent replacements, improvements and the like made within the spirit and principles of the present disclosure, should all be included in the present disclosure within the scope of protection.

What is claimed is:

1. A method of displaying search results, comprising:
sending a key word to a server so that the server performs a search according to the key word to obtain at least two web page files, each of the web page files including at least one search result matching the key word;
receiving the at least two web page files sent by the server;

according to a web page style and a special display effect corresponding to each of the web page files, rendering each of said web page files to display the search result matching the key word;

wherein before rendering each of said web page files according to the web page style and the special display effect corresponding to each of the web page files, the method further comprises:

receiving the web page style corresponding to each of the web page files sent by the server, and obtaining the special display effect corresponding to each of said web page files preset locally;

wherein the method further comprises:

obtaining a web page resource preset locally;

displaying the web page resource during display of search results included in each web page file and matching the key word.

2. The method according to claim 1, wherein rendering each of said web page files according to the web page style and the special display effect corresponding to each of the web page files comprises:

rendering each web page file according to the web page style and the special display effect of each web page file and the web page style of a web page file preceding each web page file, to display search results included by each web page file and matching with the key word.

3. The method according to claim 1, wherein the method further comprises:

performing a deletion operation or a display position adjustment operation for the search result according to a gesture for the search result; or, displaying a web page of the search result details according to a click operation for the search result.

4. The method according to claim 3, wherein the method further comprises:

when the web page of the search result details undergoes web page skip, switching the current web page from the detail web page of the search result to other web pages according to a preset special switching effect.

5. A method of displaying search results, wherein the method comprises:

receiving a key word sent by a client;

performing a search according to the key word to obtain at least two web page files, each of the web page files including at least one search result matching the key word;

sending at least two web page files to the client so that the client, according to a web page style and a special display effect corresponding to each of said web page files, renders each of the web page files to display the search result matching the key word, and sending, to the client, the page style corresponding to each of the page files so that the client obtains a web page resource preset locally and displays the web page resource during display of search results included in each web page file and matching the key word.

6. The method according to claim 5, wherein performing a search according to the key word to obtain at least two web page files comprises:

performing a search according to the key word to obtain at least two search results matching the key word;

generating the at least two web page files according to at least two search results matching the key word.

7. The method according to claim 5, wherein the method further comprises:

sending, to the client, the web page style or the special display effect corresponding to each of the web page files; or sending, to the client, the web page style corresponding to each of the web page files; or sending, to the client, the special display effect corresponding to each of the web page files.

8. An apparatus, comprising
one or more processor;
a memory;
one or more programs stored in the memory and configured to execute the following operation when executed by the one or more processors:

receiving a key word sent by a client;

performing a search according to the key word to obtain at least two web page files, each of the web page files including at least one search result matching the key word;

sending at least two web page files to the client so that the client, according to a web page style and a special display effect corresponding to each of said web page files, renders each of the web page files to display the search result matching the key word, and sending, to the client, the page style corresponding to each of the page files so that the client obtains a web page resource preset locally and displays the web page resource during display of search results included in each web page file and matching the key word.

9. The apparatus according to claim 8, wherein the operation of performing a search according to the key word to obtain at least two web page files comprises:

performing a search according to the key word to obtain at least two search results matching the key word;

generating the at least two web page files according to at least two search results matching the key word.

10. The apparatus according to claim 8, wherein the operation further comprises:

sending, to the client, the web page style or the special display effect corresponding to each of the web page files; or sending, to the client, the web page style corresponding to each of the web page files; or sending, to the client, the special display effect corresponding to each of the web page files.

11. A non-transitory computer storage medium in which one or more programs are stored, an apparatus being enabled to execute the following operation when said one or more programs are executed by the apparatus:

sending a key word to a server so that the server performs a search according to the key word to obtain at least two web page files, each of the web page files including at least one search result matching the key word;

receiving the at least two web page files sent by the server;

according to a web page style and a special display effect corresponding to each of the web page files, rendering each of said web page files to display the search result matching the key word;

wherein before rendering each of said web page files according to the web page style and the special display effect corresponding to each of the web page files, the method further comprises:

receiving the web page style corresponding to each of the web page files sent by the server, and obtaining the special display effect corresponding to each of said web page files preset locally;

wherein the method further comprises:

obtaining a web page resource preset locally;

displaying the web page resource during display of search results included in each web page file and matching the key word.

12. The non-transitory computer storage medium according to claim 11, wherein the operation of rendering each of said web page files according to the web page style and the special display effect corresponding to each of the web page files comprises:
rendering each web page file according to the web page style and the special display effect of each web page file and the web page style of a web page file preceding each web page file, to display search results included by each web page file and matching with the key word.

13. The non-transitory computer storage medium according to claim 11, wherein the operation further comprises:
performing a deletion operation or a display position adjustment operation for the search result according to a gesture for the search result; or,
displaying a web page of the search result details according to a click operation for the search result.

14. The non-transitory computer storage medium according to claim 13, wherein the operation further comprises:
when the web page of the search results undergoes web page skip, switching the current web page from the detail web page of the search result to other web pages according to a preset special switching effect.

15. A non-transitory computer storage medium in which one or more programs are stored, an apparatus being enabled to execute the following operation when said one or more programs are executed by the apparatus:
receiving a key word sent by a client;
performing a search according to the key word to obtain at least two web page files, each of the web page files including at least one search result matching the key word;
sending at least two web page files to the client so that the client, according to a web page style and a special display effect corresponding to each of said web page files, renders each of the web page files to display the search result matching the key word, and
sending, to the client, the page style corresponding to each of the page files so that the client obtains a web page resource preset locally and displays the web page resource during display of search results included in each web page file and matching the key word.

16. The non-transitory computer storage medium according to claim 15, wherein the operation of performing a search according to the key word to obtain at least two web page files comprises:
performing a search according to the key word to obtain at least two search results matching the key word;
generating the at least two web page files according to at least two search results matching the key word.

17. The non-transitory computer storage medium according to claim 15, wherein the operation further comprises:
sending, to the client, the web page style or the special display effect corresponding to each of the web page files; or
sending, to the client, the web page style corresponding to each of the web page files; or
sending, to the client, the special display effect corresponding to each of the web page files.

* * * * *